(12) United States Patent  
Gearhardt et al.

(10) Patent No.: US 7,375,570 B2  
(45) Date of Patent: May 20, 2008

(54) HIGH-SPEED TDF TESTING ON LOW COST TESTERS USING ON-CHIP PULSE GENERATORS AND DUAL ATE REFERENCES FOR RAPIDCHIP AND ASIC DEVICES

(75) Inventors: Kevin Gearhardt, Fort Collins, CO (US); Doug Feist, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 275 days.

(21) Appl. No.: 11/153,879

(22) Filed: Jun. 15, 2005

(65) Prior Publication Data

US 2006/0284665 A1    Dec. 21, 2006

(51) Int. Cl.
*H03K 3/00* (2006.01)
*G06F 1/04* (2006.01)

(52) U.S. Cl. .................. 327/298; 327/291; 324/76.54

(58) Field of Classification Search ........ 327/113–114, 327/116, 122, 165, 166, 291, 298; 324/755, 324/765, 76.54

See application file for complete search history.

(56) References Cited

U.S. PATENT DOCUMENTS

| | | | | |
|---|---|---|---|---|
| 5,003,194 | A * | 3/1991 | Engelhard | 327/176 |
| 5,717,352 | A * | 2/1998 | Ebiya | 327/166 |
| 6,058,057 | A * | 5/2000 | Ochiai et al. | 365/201 |
| 6,060,898 | A * | 5/2000 | Arkin | 324/765 |
| 6,275,057 | B1 * | 8/2001 | Takizawa | 324/765 |
| 6,557,128 | B1 * | 4/2003 | Turnquist | 714/724 |
| 7,155,651 | B2 * | 12/2006 | Nadeau-Dostie et al. | 714/731 |
| 7,202,656 | B1 * | 4/2007 | Gearhardt et al. | 324/76.53 |

* cited by examiner

*Primary Examiner*—Dinh T. Le  
(74) *Attorney, Agent, or Firm*—Trexler, Bushnell, Giangiorgi & Blackstone, Ltd.

(57) ABSTRACT

A circuit which facilitates TDF testing without having to purchase expensive new test equipment, such as a new test platform that is capable of supporting test frequencies well beyond the current 200 MHz limitation. A solution to current TDF testing problems by adding circuitry to the device-under-test (DUT) that is configured to receive two reference clock signals from automated test equipment (ATE), i.e. conventional ATE which does not provide test frequencies beyond 200 Mhz, and create two high-speed clock pulses that serve as the launch and capture clocks for the TDF test sequence on the DUT.

12 Claims, 2 Drawing Sheets

HIGH-SPEED TDF TESTING ON LOW COST TESTERS USING ON-CHIP PULSE GENERATORS AND DUAL ATE REFERENCES FOR RAPIDCHIP AND ASIC DEVICES

BACKGROUND

The present invention generally relates to the production test requirement for timing delay fault (TDF) testing for RapidChip and ASIC devices.

In order to meet expectations for shipped product quality levels, the traditional stuck-at fault testing is no longer adequate to reach those quality levels. As such, TDF testing has become a requirement for any and all product applications for which product quality is of utmost concern, e.g. storage components. During TDF testing, a very fast clock pulse is provided to a device-under-test (DUT). The specific problem seen with TDF testing is that most current production test systems cannot exceed a 200 Mhz effective TDF test rate. With 130 nm technology being widely used, and 90 nm technology on the horizon, the 200 Mhz test rate is not adequate to detect TDF-type failures. A higher speed solution is needed on these existing tester platforms, without having to spend significant capital resources to upgrade to newer tester platforms.

One existing solution to the aforementioned problem is to purchase newer tester platforms (i.e., expensive ATE) that can support test frequencies well beyond the current 200 Mhz limitation. However, the capital expenditures required to implement such a solution render the approach infeasible.

Another possible solution would be to utilize on-chip PLL circuitry to create the high-speed clock pulse pair required for the TDF launch/capture clocks. However, this approach is very limited with respect to its flexibility of use on the design, characterization of the maximum TDF operational speed, and being able to test multiple clock domains/frequencies on a single device. Hence, on-chip PLL circuitry is not generally used for TDF testing.

OBJECTS AND SUMMARY

An object of an embodiment of the present invention is to perform TDF testing without having to purchase expensive new test equipment, such as a new test platform that is capable of supporting test frequencies well beyond the current 200 MHz limitation.

Another object of an embodiment of the present invention is to perform TDF testing without having to utilize on-chip PLL circuitry to create a high-speed clock pulse pair.

Briefly, and in accordance with at least one of the foregoing objects, an embodiment of the present invention provides a solution to the aforementioned TDF test problem by adding circuitry to the device-under-test (DUT) that is configured to receive two reference clock signals from automated test equipment (ATE), i.e. conventional ATE which does not provide test frequencies beyond 200 Mhz, and create two high-speed clock pulses that serve as the launch and capture clocks for the TDF test sequence on the DUT.

BRIEF DESCRIPTION OF THE DRAWINGS

The organization and manner of the structure and operation of the invention, together with further objects and advantages thereof, may best be understood by reference to the following description, taken in connection with the accompanying drawing, wherein.

DESCRIPTION

Figure 1:
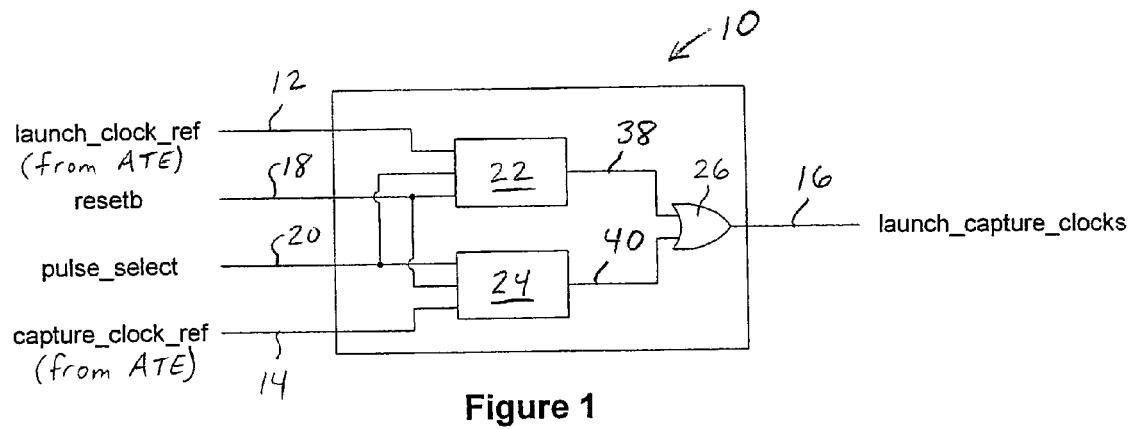
FIG. 1 is a digital logic block diagram of a circuit which is in accordance with an embodiment of the present invention.

While the invention may be susceptible to embodiment in different forms, there are shown in the drawings, and herein will be described in detail, specific embodiments of the invention. The present disclosure is to be considered an example of the principles of the invention, and is not intended to limit the invention to that which is illustrated and described herein.

FIG. 1 illustrates a circuit 10 which is in accordance with an embodiment of the present invention. The circuit 10 allows for TDF testing without having to purchase expensive new test equipment, such as a new test platform that is capable of supporting test frequencies well beyond the current 200 MHz limitation.

The present invention provides a solution to the aforementioned TDF test problem by adding circuitry 10 such as is shown in FIG. 1 to the device-under-test (DUT) that can take two reference clocks 12, 14 ("launch_clock_ref" and "capture_clock_ref" respectively) from the automated test equipment (ATE) and create two high-speed clock pulses that serve as the launch and capture clocks 16 ("launch_capture_clocks") for the TDF test sequence on the DUT.

FIG. 1 illustrates the circuitry 10, which is a digital logic block containing the gates necessary to implement the logic, four input signals 12, 14, 18, 20 ("launch_clock_ref", "capture_clock_ref", "resetb" and "pulse_select", respectively) and one output signal 16 ("launch_capture clocks").

The "launch_clock_ref" and "capture_clock_ref" signals (12 and 14) are provided by the ATE. The rising edge of either clock reference generates a narrow pulse from a respective pulse generator circuit 22, 24. The resultant pulses are then logically OR'd (by OR gate 26) to create the two-pulse clock stream required for a launch and capture sequence and is presented at the signal "launch_capture_clocks" (16 in FIG. 1). As previously mentioned, the typical ATE in use today can only provide a 200 Mhz clock signal to the DUT. However, two different tester pins of the ATE can each provide a reference clock pulse 12 and 14 ("launch_clock_ref" and "capture_clock_ref", respectively) such that the rising edge to rising edge between those signals is as little as 10's of picoseconds. For example, if the desired TDF test frequency for the DUT were 500 MHz, the launch and capture clocks would have to have a 2 ns delay from launch rising edge to capture rising edge on-chip, and the ATE would be specifically programmed such that the two signals "launch_clock_ref" and "capture_clock_ref" have this 2 ns delay. The pulse generator circuits 22, 24 would each generate a 1ns pulse which when OR'd with one another would create the needed launch/capture clock sequence on the DUT.

The "pulse_select" signal (20) could be provided from other logic within the DUT. The purpose of this signal is to allow the user to select from different pulse widths that would generate a clock pulse pair that has roughly a 50% duty cycle. This functionality may not be required or desired for the targeted application, but rather the pulse generator circuit could simply generate a minimum pulse width equal to whatever value would result in a 50% duty cycle for the fastest possible TDF test frequency. Using the previously cited example of 500 MHz, this would equate to a 1ns pulse width. Any logic whose TDF testing was performed at lower frequencies would simply have a lesser duty cycle.

The "resetb" signal (18) is preferably also provided from other logic within the DUT and preferably represents the overall DUT reset trigger. This ensures that the pulse generator circuits 22, 24 are properly conditioned for testing at the start of any TDF test block.

The pulse generator circuits 22, 24 shown in FIG. 1 are preferably simple digital circuits that generate a narrow pulse referenced to the rising edge of the reference clock signal (i.e., "launch_clock_ref" and "capture_clock_ref") provided to the circuit 10. Preferably, the circuit is designed based on the specific application.

Figure 2:
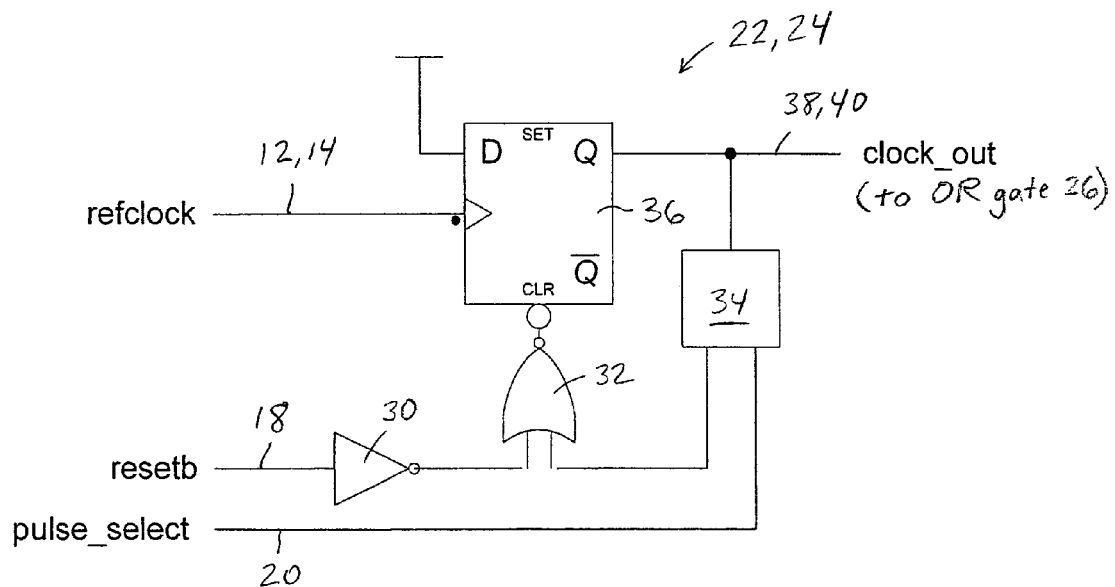
FIG. 2 illustrates a possible implementation of a pulse generator circuit of the circuit shown in FIG. 1.

FIG. 2 represents a possible implementation of each pulse generator circuit 22, 24 of FIG. 1. As shown, each pulse generator circuit 22, 24 may include an invertor 30, a NOR gate 32, a delay circuit 34 and a flip-flop 36 (preferably rising-edge-triggered). Preferably, each pulse generator circuit 22, 24 is configured to take a single input clock signal "refclock" (i.e., in the case of pulse generator 22, "refclock" would be "launch_clock_ref" (i.e., signal 12 in FIG. 1); and in the case of pulse generator 24, "refclock" would be "capture_clock_ref" (i.e., signal 14 in FIG. 1)), and generate a "clock out" pulse 38, 40 whose width is determined by the delay circuit 34. As shown in FIG. 1, the two pulse generator circuits 22, 24 have their outputs 38, 40 logically OR'd to create the "launch_capture_clocks" output signal 16.

Figure 3:
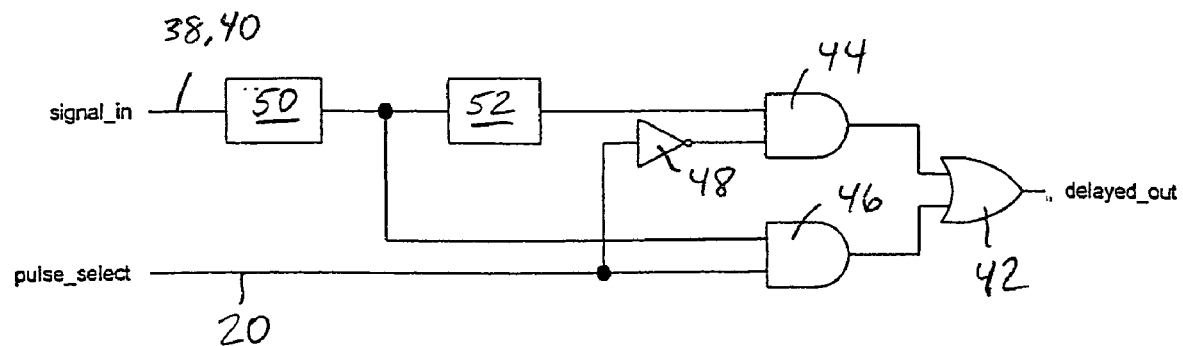
FIG. 3 illustrates a possible implementation of a delay circuit of the pulse generator circuit shown in FIG. 2.

FIG. 3 represents a possible implementation of the delay circuit 34 which is included in each pulse generator circuit 22, 24. As shown in FIG. 3, each delay circuit 34 may include an OR gate 42, AND gates 44 and 46, an invertor 48 and two delay circuits 50, 52. The delay circuit 50 may be configured to provide a 1000 ps delay, and the delay circuit 52 may be configured to provide a 1500 ps. In such case, preferably the delay circuit 34 is configured such that the "pulse_select" signal 20 is used to select either a 1000 ps or 1500 ps delay (i.e., either the delay associated with delay circuit 50 or delay circuit 52) as is appropriate for the desired TDF test frequency. The value of these delay blocks is somewhat arbitrary depending on the targeted TDF test frequency or range of TDF test frequencies. If desired, the "pulse_select" functionality could be eliminated altogether and the delay circuit included in each pulse generator circuit 22, 24 (i.e., each delay circuit shown in FIG. 2) could be configured to provide a fixed delay, such as a fixed delay of 1000 ps, for example.

Figure 4:
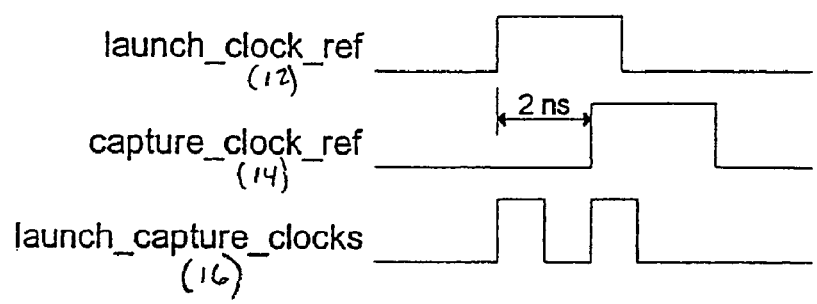
FIG. 4 provides a pulse diagram of the input clock pulses and the output pulse of the circuit of FIG. 1.

FIG. 4 provides a pulse diagram of the input clock pulses 12, 14 ("launch_clock_ref" and "capture_clock_ref") and the output pulse 16 ("launch_capture_clocks") of the circuit 10 of FIG. 1, effectively depicting operation of the circuit as it relates to the inputs and the output, i.e., operation of the circuit within the DUT during a launch/capture sequence within a TDF test block. Staying with the 500 Mhz example, the ATE supplies the two needed reference clocks 12, 14 ("launch_clock_ref" and "capture_clock_ref", respectively) with a 2 ns skew between their rising edges. This causes the on-chip circuitry to generate two 1ns pulses whose rising edges are separated by 2 ns which equates to a 500 Mhz TDF test sequence 16 ("launch_capture_clocks).

It should be noted that the physical layout of the test circuitry in FIG. 1 is critical with respect to the delay from either clock reference input to the clock output. These two paths must be exactly matched to ensure the highest degree of accuracy with respect to knowing exactly what the resultant TDF test rate is set to.

Since the logic to generate the high-speed clock pulses is implemented on the actual device to be tested, the maximum frequency which can be generated is theoretically only limited by the performance of the process technology associated with the design. In practice, the maximum frequency which can be generated will be more than sufficient to provide the needed TDF test coverage.

Any test application which requires consecutive high-speed clock pulses could use this approach to testing.

While embodiments of the present invention are shown and described, it is envisioned that those skilled in the art may devise various modifications of the present invention without departing from the spirit and scope of the appended claims.

What is claimed is:

1. A circuit which is configured to receive a plurality of reference clock signals and use the reference clock signals to create a plurality of clock pulses that serve as launch and capture clocks for a TDF test sequence on a device-under-test, further comprising a plurality of pulse generators, each of which is configured to receive one of said reference clock signals and collectively create clock pulses that serve as the launch and capture clocks for the TDF test sequence, wherein each pulse generator includes a delay circuit and is configured to take a single input clock signal and generate a clock output pulse having a width which is determined by the delay circuit and a pulse select input signal which is provided to the delay circuits of all the pulse generators.

2. A circuit as recited in claim 1, wherein the circuit is configured such that the plurality of clock pulses which are created by the circuit are provided at a single output and have a higher frequency than do each of the reference clock signals which are received by the circuit.

3. A circuit as recited in claim 1, further comprising an OR gate, wherein an output of each pulse generator is connected to the OR gate, and an output of the OR gate provides the launch and capture clocks for the TDF test sequence.

4. A circuit as recited in claim 1, wherein the pulse select input signal provides a clock pulse pair that has a 50% duty cycle.

5. A circuit as recited in claim 1, further comprising a reset signal which is provided to the pulse generators, wherein the reset signal resets the pulse generators.

6. A circuit as recited in claim 1, wherein each pulse generator includes a rising-edge-triggered flip flop, and wherein the delay circuit is configured to receive an output of the rising-edge-triggered flip flop.

7. A circuit which is configured to receive a plurality of reference clock signals and use the reference clock signals to create a plurality of clock pulses that serve as launch and capture clocks for a TDF test sequence on a device-under-test, further comprising a plurality of pulse generators, each of which is configured to receive one of said reference clock signals and collectively create clock pulses that serve as the launch and capture clocks for the TDF test sequence, further comprising a reset signal which is provided to the pulse generators, wherein the reset signal resets the pulse generators, further comprising a pulse select input signal which is provided to the pulse generators, wherein the pulse select input signal provides a clock pulse pair that has a 50% duty cycle.

8. A circuit as recited in claim 7, wherein the circuit is configured such that the plurality of clock pulses which are created by the circuit are provided at a single output and have a higher frequency than do each of the reference clock signals which are received by the circuit.

9. A circuit as recited in claim 7, further comprising an OR gate, wherein an output of each pulse generator is connected to the OR gate, and an output of the OR gate provides the launch and capture clocks for the TDF test sequence.

10. A circuit which is configured to receive a plurality of reference clock signals and use the reference clock signals to create a plurality of clock pulses that serve as launch and capture clocks for a TDF test sequence on a device-under-test, further comprising a plurality of pulse generators, each of which is configured to receive one of said reference clock signals and collectively create clock pulses that serve as the launch and capture clocks for the TDF test sequence, further comprising a pulse select input signal which is provided to the pulse generators, wherein the pulse select input signal provides a clock pulse pair that has a 50% duty cycle.

11. A circuit as recited in claim 10, wherein the circuit is configured such that the plurality of clock pulses which are created by the circuit are provided at a single output and have a higher frequency than do each of the reference clock signals which are received by the circuit.

12. A circuit as recited in claim 10, further comprising an OR gate, wherein an output of each pulse generator is connected to the OR gate, and an output of the OR gate provides the launch and capture clocks for the TDF test sequence.

* * * * *